April 8, 1958 — A. E. CURRIER — 2,829,419
METHOD FOR SEPARATING TILE BODIES IN STUCK RELATION
Filed June 25, 1956
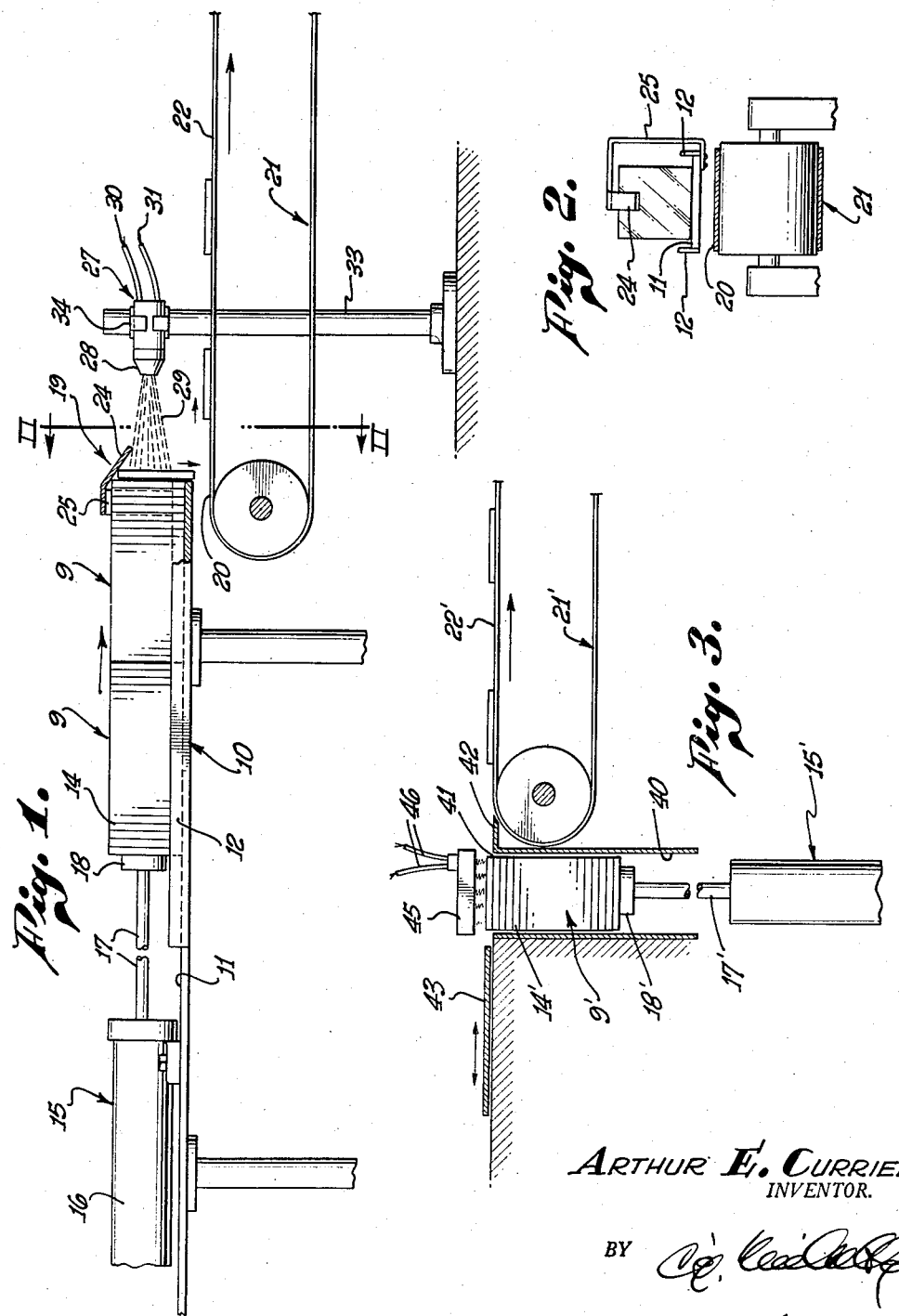
Arthur E. Currier,
INVENTOR.
BY
ATTORNEY.

United States Patent Office 2,829,419
Patented Apr. 8, 1958

2,829,419

METHOD FOR SEPARATING TILE BODIES IN STUCK RELATION

Arthur E. Currier, Sun Valley, Calif., assignor to Gladding, McBean & Co., Los Angeles, Calif., a corporation of California Application June 25, 1956, Serial No. 593,445

6 Claims. (Cl. 25—156)

This invention relates to the manufacture of ceramic tile and more particularly to a method for rapidly and continuously separating clay composition tile bodies which have been fired in stacked relation in bungs, each tile body in the bung being stuck to an adjacent tile body.

The stacking of pressed tile bodies of clay composition in bungs of 10 to 36 for burning is well known in the mass production of ceramic tile. When stacked in a bung, adjacent tile bodies have surfaces contacting an opposed surface of an adjacent tile body. During firing of the bung in a kiln, the contacting surfaces of the adjacent tile bodies become sufficiently stuck together to resist attempts to separate the tile bodies after firing by manually pulling the tile bodies apart.

Prior methods of handling such fired, stuck together clay composition tile bodies in bungs between a kiln and a spray zone for application of glaze compositions have included the steps of receiving burned tile bodies in a bung from a kiln, manually separating the bung into pairs of stuck tile by inserting a knife between the pairs of tile (called picking), and then manually dropping each pair of stuck tile upon a flat metal plate to separate the tile of the pair (called ringing). The steps of picking and ringing obviously require considerable handling and transportation of the tile bodies. Such handling results in broken, chipped or otherwise damaged tile bodies which must be rejected before the tile bodies reach the spray zone for application of glaze compositions.

The present invention is particularly directed to an improved method of handling bungs of fired tile bodies to separate the tile bodies in such a manner as to obviate the disadvantages of the prior proposed manual handling methods. The present invention contemplates a method whereby bungs or fired tile bodies in stuck relation are continuously advanced into a separation zone. At the separation zone, heat is applied to only one leading tile body to cause virtually instantaneous heating thereof for differentially expanding the leading tile body with respect to the succeeding or second tile body. Differential expansion of one tile body with respect to the other causes the bond between the contacting surfaces of adjacent tile to break and thus the leading tile is separated from its adjacent second tile. The separated tile body is then rapidly moved out of the separation zone and the procedure of expanding the advancing leading tile is repeated as the new leading tile arrives in the separation zone. The invention contemplates apparatus capable of handling bungs so as to rapidly and continuously feed tile bodies in stuck relation to a separation zone and to rapidly remove the separated tile bodies from said zone.

The primary object of this invention therefore is to disclose and provide a continuous rapid method of separating fired tile bodies in stuck relation from each other.

Another object of this invention is to disclose and provide a method for separating such stuck together tile bodies in a bung wherein manual handling of said bung and said tile bodies is reduced to a minimum.

A further object of this invention is to disclose and provide a method for separating fired tile bodies in stuck relation wherein damage to said tile bodies is reduced to a minimum.

Numerous objects and advantages of this invention will be readily apparent to those skilled in the art from the following description and drawings in which the method and exemplary embodiments of the apparatus are shown.

In the drawings:

Fig. 1 is an elevational view of an apparatus for carrying out the method of this invention.

Fig. 2 is a transverse sectional view taken in the plane indicated by line II—II of Fig. 1.

Fig. 3 is an elevational view illustrating diagrammatically a different embodiment of an apparatus for carrying out the method of this invention.

In the production of clay composition tile, a bung of tile bodies in stacked relation may be formed by stacking the tile bodies in face-to-face, back-to-back relation or in face-to-back relation. The face of a tile body normally receives the glaze composition and is the surface which presents a decorative appearance. The back of a tile body is the surface which is pressed against a bed of cement or adhesive material for securing the tile to a wall. This invention is applicable to separation of tile bodies in a bung whether they are stacked in face-to-face, back-to-back or face-to-back relation.

In accordance with the present invention, such a fired bung 9 of tile bodies may be directed in any suitable manner to a receiving station including a frame means generally indicated at 10. The frame means may be provided with a smooth flat elongated surface 11 having guide rails 12 provided along opposite longitudinal edges thereof.

One or more bungs 9 may be placed in tandem upon surface 11 with the longitudinal axis of each bung in alignment and lying in the direction of the longitudinal axis of surface 11. Each tile body 14 of a bung 9 is thus positioned in edgewise relation to surface 11 and with front and back surfaces of each body 14 substantially perpendicular to a path of travel for movement of the tile, said path being in the direction of the longitudinal axis of a bung 9.

Means for advancing bung 9 along said path of travel on surface 11 may comprise exemplarily a retractable pusher means 15 comprising a suitable fluid-operated cylinder 16 provided with a pusher rod 17 having a pusher head 18 at the end thereof adapted to press against the back surface of the last tile of the bung. The pusher means 15 slidably moves the bung of tile bodies along surface 11 to a separation zone 19, said separation zone being located at the end of surface 11. When all tile bodies of the bung have been separated and the pusher head 18 is at the separation zone, the head 18 may be retracted and additional bungs of stuck together fired tile may be fed to the receiving station.

At separation zone 19 it will be noted that surface 11 ends in overlying relation to an end portion 20 of an endless belt conveyor 21, the top lay 22 of the conveyor moving in the same direction as that of an advancing bung 9. The top surface of the top lay 22 is spaced below surface 11 a suitable selected distance such as 1 or 2 inches. Above surface 11 a downturned tile contact member 24 is provided to guide the top portion of a separated tile body downwardly to prevent such a separated tile from first falling forwardly. The tile contact member 24 may be made of a suitable resilient material and may be carried by a bracket 25 secured to frame means 10.

A heating means 27 to differentially expand a leading tile body 14 with respect to its succeeding or second tile body may be positioned in prolongation of the path of travel of bung 9 and facing the leading tile body to direct heat against the front exposed surface thereof. Heating means 27 may comprise any suitable heat source and in this example a gas burner nozzle 28 directs a relatively broad flame 29 against the surface of the leading tile body. Nozzle 28 may be connected to a hose 30 in communication with a supply source of gas or inflammable fluid. If desired, compressed air supplied through hose 31 may be mixed with the gas from hose 30 in well known manner to secure a selected flame characteristic for imparting and transferring to the leading tile sufficient heat to cause rapid expansion thereof. The amount of heat and the rate at which the heat is applied to the tile body is correlated to the rate of advancement of the tile bodies 14 in the bung 9 by pusher means 15 so that as the leading tile body 14 is moved beyond the end of surface 11, it will be or has just been separated from the succeeding or second tile 14 by cracking or breaking of the bond between the opposed contacting surfaces of the tile bodies. Immediately upon separation and advancement over the end of surface 11 the separated tile body falls edgewise to the top lay 22 of conveyor 21. The bottom edge of the separated body first strikes the lay 22 and is moved forwardly by the moving conveyor 21 so that the top portion of the tile body, in cooperation with member 24, slides downwardly off the front surface of the second tile and thereby unmasks said surface for exposure to the flame 29. The separated leading tile body is thus gently progressively settled upon the top lay 22 of the conveyor 21 for movement thereof to a spray zone for application of glazing compositions.

It will be noted that the spacing of top lay 22 a sufficient distance below surface 11 will facilitate the rapid removal of a separated tile body from the area of flame impingement and that the second tile body is thus rapidly exposed to the flame so that its differential expansion with respect to its adjacent following tile body may be sufficiently pronounced so as to cause separation therefrom by its expansion. Thus as the bung is advanced, each tile body 14 is subjected to flame 29 for rapid expansion thereof, a breaking of the bond with its adjacent tile body and then a rapid removal from the separation zone. There is thus little opportunity for the heat of flame 29 to be progressively transferred along the bung 9 in a direction opposite to the movement of bung 9. It is understood that such progressive heat transfer might result in insufficient differential expansion between adjacent tile bodies, and such a condition would result in non-separation of the tile bodies. When the rate of advancement of the bung and the rate of heat transfer to the leading tile body is correlated in preferred manner, the leading tile body will be virtually suspended above top lay 22 at the precise moment that its back surface leaves the end of surface 11 at the coincident moment of breaking of the bond with the front surface of the adjacent tile body. Thus at the moment of separation, the leading tile body is positioned for falling to the top lay 22 and thus carries away heat which has been transferred to it by flame 29.

Means to support the heating means 27 may comprise a suitable standard 33 carrying an adjustable clamp 34 which secures the heating means 27 above the conveyor 21. The standard 33 may be adjustably positioned so as to space nozzle 28 a selected distance from the end of surface 11 and the clamp 34 may be adjusted vertically to position the nozzle 28 in desired relation to the front surface of the leading tile 14. It is understood that the heating means 27 may comprise any suitable source of heat, such as the nozzle means shown, an electrically heated hot plate, a gas heated hot plate and the like.

In Fig. 3 is illustrated a different embodiment of an apparatus for separating tile bodies in stuck relation in a rapid continuous manner. In Fig. 3, a pusher means 15' is arranged vertically with a pusher rod 17' extending upwardly into guide means forming a vertical elongated chamber 40. A pusher head 18' supports a bung 9' of tile bodies 14' in said chamber.

At one side of the guide means forming chamber 40 may be positioned an endless belt conveyor 21' having a top lay 22'. The top surface of top lay 22' lies in the same plane as open end 41 of chamber 40. Extending between the open end 41 and the adjacent end of top lay 22' may be a horizontal plate 42. At the opposite side of opening 41 may be provided a reciprocally movable ejection rod 43 actuated in any well known manner as by a rack and pinion drive (not shown) correlated to the rate of rise of pusher head 18'.

Directly above opening 41 and in spaced relation thereto may be a hot plate 45 electrically energized through leads 46, the hot surface of said plate facing the top surface of the top tile body 14' of bung 9'.

As pusher means 15' intermittently lifts pusher head 18' a distance approximately equivalent to the thickness of a tile body 14', such a tile body is introduced to a separation zone 19 lying directly beneath hot plate 45 and just above the plane of opening 41. Rapid expansion of the top tile body causes separation from the adjacent tile therebelow and as such separation occurs, the reciprocating ejection rod 43 is actuated to push a separated tile body 14' laterally across plate 42 and onto the top lay 22' of the conveyor 21'. The ejection rod 43 is then retracted and the next tile body is moved upwardly into the separation zone 19. It will thus be apparent that individual tile bodies 14' are thus continuously intermittently moved into a separation zone and that they are rapidly ejected from said zone upon separation by ejection rod 43.

In the latter apparatus and method, it will be apparent to those skilled in the art that tile bodies stacked in face-to-back relation in a bung may be fed to chamber 40 with the face of the tile directed upwardly so that as each tile is separated it may be conveyed directly by conveyor means 21' to a spray zone. In the first embodiment of this invention, bungs of tile stacked in face-to-back relation will likewise be capable of being transmitted directly to a spray zone by conveyor 21 because the face of the tile will be upwardly directed for receiving an application of glazing composition.

In each of the apparatuses and methods described above, if the bungs are formed with tile bodies stacked in face-to-face, back-to-back relation, it becomes necessary to reverse alternate tile as they proceed along conveyor 21. Since the tile must be inspected before entering the glazing zone, such reversing of alternate tile can be readily accomplished.

It will be understood by those skilled in the art that various modifications and changes may be made in the method and apparatus of this invention described above, and all such changes and modifications coming within the scope of the appended claims are embraced thereby.

I claim:

1. In the manufacture of clay tile, the method of separating individual tile bodies from a bung of tile bodies stuck together after firing, comprising: moving a bung of tile bodies in a substantially horizontal path with the bung disposed edgewise and its longitudinal axis lying in the direction of said path; applying heat to the exposed surface of the leading tile body at a separation zone in said path and while said tile are moving for rapidly expanding only said leading tile body to separate the same from the second tile body by differential expansion; and moving the separated tile body at an accelerated rate out of said separation zone.

2. In the manufacture of clay tile, the method of separating individual tile bodies from a bung of tile bodies having adjacent surfaces in contact and stuck together after firing, comprising: moving a bung of stuck together tile bodies with said surfaces lying transverse to the path of said bung; directing heat against the front surface of the leading tile body while said tile bodies are moving to rapidly expand said leading tile body to cause separation of the rear surface of said leading tile body from the front surface of the second tile body; and moving the separated tile body out of said separation zone.

3. In the art of manufacturing tile of clay composition, each having oppositely directed surfaces, adjacent surfaces of adjacent tile bodies being in contact and in stuck relation after firing, the method of separating each tile body from its adjacent tile body, comprising: moving a plurality of said tile bodies in stuck relation along a path towards a separation zone; heating only the leading tile body in the separation zone to expand the same relative to the adjacent tile body to cause separation therefrom; and moving the separated tile body out of the path of the adjacent tile body.

4. In the art of manufacturing tile or clay composition, each having oppositely directed surfaces, adjacent surfaces of adjacent tile bodies being in contact and in stuck relation after firing, the method of separating each tile body from its adjacent tile body, comprising: continuously advancing a plurality of said tile bodies in stuck relation along a path; heating the leading tile body to expand the same relative to the adjacent tile body to cause separation therefrom; and moving the separated tile body out of the path of travel of said plurality of tile bodies.

5. In the method stated in claim 3 wherein the step of moving the separated tile body out of the path of the adjacent tile body includes moving the separated tile body transversely to said path.

6. In the art of manufacturing tile of clay composition, each having oppositely directed surfaces, adjacent surfaces of adjacent tile bodies being in contact and in stuck relation after firing, the method of separating each tile body from its adjacent tile body, comprising: continuously moving a plurality of said tile bodies in a selected path toward a separation zone; directing heat against the leading tile body while moving into said separation zone; regulating the amount of heat applied to said leading tile body and the rate of movement of said tile bodies to cause separation of the leading tile body from the second tile body at the separation zone; unmasking the second tile body by quickly moving the separated tile body transversely of the path to expose the second tile body to heat; and moving the separated tile body out of the separation zone at a rate to space separated tile bodies.

References Cited in the file of this patent

UNITED STATES PATENTS

| | | |
|---|---|---|
| 1,738,229 | Campbell et al. | Dec. 3, 1928 |
| 2,125,922 | Hopfield | Aug. 9, 1938 |
| 2,264,499 | Bair | Dec. 2, 1941 |